Figure 1:
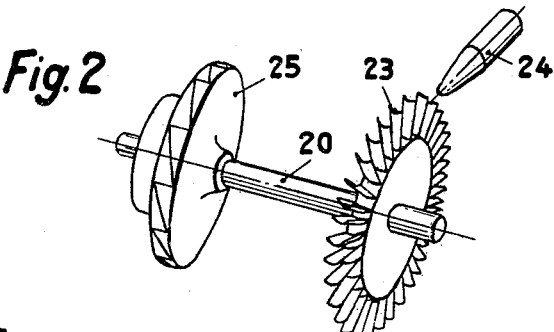
Figure 1:
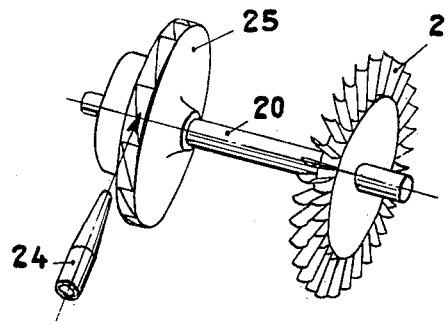
Figure 1:
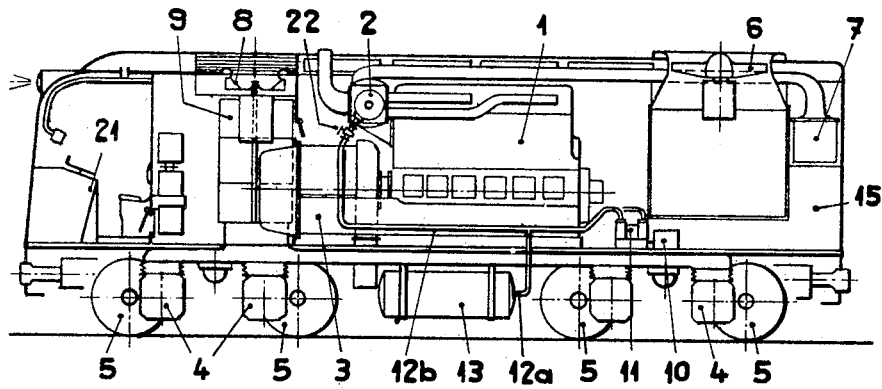

March 6, 1956  R. FEISS  2,737,017
METHOD OF IDLING COMBUSTION PRODUCT OPERATED GAS
TURBINES AND INTERCOUPLED ROTATABLE ELEMENTS
SUBJECTED TO EXTERNAL SHOCK
AT IRREGULAR INTERVALS
Filed Oct. 18, 1951

RENE FEISS
INVENTOR.

BY *[signature]*
ATTORNEY

United States Patent Office 2,737,017
Patented Mar. 6, 1956

2,737,017

METHOD OF IDLING COMBUSTION PRODUCT OPERATED GAS TURBINES AND INTERCOUPLED ROTATABLE ELEMENTS SUBJECTED TO EXTERNAL SHOCK AT IRREGULAR INTERVALS

René Feiss, Winterthur, Switzerland, assignor to Schweizerische Lokomotiv- und Maschinenfabrik, Winterthur, Switzerland Application October 18, 1951, Serial No. 251,978

Claims priority, application Switzerland October 26, 1950

2 Claims. (Cl. 60—39.03)

The instant invention relates to a method of sustaining the rotation and actuation of the movable elements of, for example, an internal combustion prime mover during such intervals as the vehicle driven thereby is coasting on an incline or grade while conserving the fuel supply.

An object of the invention is to minimize the effect of lateral shocks and stresses caused by irregularities in the trackage on which the engine-driven vehicle may be coasting with the prime mover delivering no power to the vehicle motors.

Still a further object of the invention is to provide a method whereby the internal combustion prime mover, such as a Diesel engine or a gas turbine, of a tracked vehicle is caused to run idle at speed lower than the minimum idling speed possible with the use of the fuel supply.

Certain types of prime mover installations are subjected intermittently and at irregular intervals to very marked shocks and stresses while they are either not operating or are operating without delivering power. This is the case, for example, with Diesel engine driven locomotives which are descending an incline. If the grade is sufficiently steep, the vehicle may be propelled by its own inertia and, while the driving prime mover may be cut off, it is nevertheless exposed to shocks originating in irregularities in the tracks and road bed. For their entire duration, these externally caused shocks have a hammerlike effect on the elements of the prime mover and its mounting, which are then immovable with respect to each other. The particular contacting surfaces may experience fatigue as the result of such continued shocks and permanent deformations and even minute cracks may be produced therein, which can readily lead to damage and to operational difficulties, as well as to the need of early replacement of the affected parts. In the past the effects of such shocks have been avoided by keeping the prime mover in operation during the effective period of these external shocks at a reduced R. P. M., that is, in idling condition with a reduced fuel consumption. Such method has the disadvantage that additional fuel is used, particularly in situations where the prime mover must be kept running to operate relatively small power requiring auxiliary machinery, for example outgassing turbines, etc.

To eliminate the danger of such damage to the elements of the prime mover, and also of auxiliary equipment driven thereby, while at the same time conserving the fuel supply to the greatest possible extent, the method of the instant invention keeps the prime mover operating for the duration of the conditions which involve the possibility of the described shocks by supplying to the prime mover, or to individual machines of its auxiliary group, a gas under pressure from an auxiliary source while simultaneously interrupting the supply of fuel to the prime mover for the duration of such conditions. Since it is quite sufficient to keep the prime mover and the machinery coupled thereto in slow rotation and movement, the R. P. M. of the prime mover so kept in motion is no longer tied to the minimum idling speed and may be a fraction thereof. By so actuating the prime mover at the lowest practical speed to just keep it in motion, it is obvious that a minimum of the non-combustible gas under pressure so applied is consumed.

In the application of the instant method to multi-cylinder prime movers employing pistons, the application of the auxiliary gas under pressure may be "total," that is, to all the cylinders, or "partial," that is, to one cylinder or a number of cylinders less than the total. Since the energy required to idle the prime mover at the decreased speed possible with the instant method is relatively small, it usually suffices to supply only one of the cylinders with the pressure gas.

Similarly when using the method of the instant invention with gas turbines, a "partial" application will generally be adequate. Instead of applying the gas under pressure to the bladed runners of the turbine, it may be applied to the rotor of the blower fan driven thereby. This has the advantage that the turbine blading, which has been heated by its preceding power operation, will not be cooled by the cold stream of the gas under pressure.

It is obvious that with both "total" and "partial" application, the bursts of the gas under pressure must be appropriately timed in accordance with the reduced speed of the rotating parts.

Apparatus for practicing the method of the instant invention is shown by way of illustration in the annexed drawing, in which—

Figure 1 shows a Diesel-electric locomotive in a highly simplified elevational diagram; and Figures 2 and 3 are simplified diagrams of particular detailed illustrative apparatus for the method of the instant invention as applied to a turbine driven blower.

The usual drive elements disposed within the housing of a four-axled locomotive, as shown in Figure 1, comprise essentially a 4-cycle internal combustion engine 1, a charging blower 2 driven by an exhaust-gas turbine, and an electric generator 3 coupled with the engine crankshaft, the generated current being applied to the driving motors 4 of the four driving axles 5. Figure 1 also shows various auxiliary equipment usually present, such as a blower 6 for the water recooling system, a blower 8 for cooling the electrical equipment, air filter apparatus 7 and 9, electric motor 10 driving the air compressor 11 having air lines 12a and 12b to the compressed air tank 13 and to the charging blower 2. Substantially uniform pressure is maintained at all times in tank 13 by an automatic pressure regulator.

Assuming that the vehicle is, for example, travelling down into a valley and the driving aggregate, engine 1 with generator 3, is switched off so as to be at rest since no vehicle propelling force is required, the locomotive engineer can maintain in motion rotor 20 (Figures 2 and 3) of the charging blower 2 by the instant method. For this purpose, by operation of controller 21 in the operator's cabin, he opens valve 22 of air line 12b by remote control, whereupon, as shown by way of example in Figure 2, compressed air from nozzle 24 is applied to bucket wheel 23 of the exhaust gas-driven turbine of the charging blower 2. Nozzle 24 is of such proportions that but a small stream of air flows, rotating the rotor but slowly. Since rotor shaft 20 thus continues to rotate, the two end bearings of the shaft (not shown in the drawings) cannot be harmed by shocks, jars, tremors, etc., of the vehicle as would be the case were the shaft at rest in its bearings.

In the modification of Figure 3, the compressed air nozzle 24 directs the flow against the blower fanwheel 25 and not against the blade wheel 23. As has been above stated, this modification has the advantage, as compared to the Figure 2 embodiment, that no sudden cooling of the heated turbine blades occurs, even though the air consumption will perhaps be somewhat greater in this Figure 3 embodiment assuming, as has been done in such figure, that the blower is a centrifugal blower and hence is not operable too efficiently on being driven by a jet of air.

What is claimed is:

1. The method of maintaining in rotation the rotatable elements of an intercoupled gas turbine operated by the gaseous combustion products from an internal combustion prime mover and of an air blower, both of which are subjected to external shocks at irregular intervals, in order to minimize the injurious effect of shocks thereon, comprising interrupting the flow of the combustion products normally propelling the gas turbine rotor on the occurrence of a condition giving rise to external shocks, substantially simultaneously applying a non-combustible gas under pressure to the blower rotor in the direction aiding its rotation, and maintaining the application of the non-combustible gas in such direction for the duration of the condition.

2. The method of maintaining in rotation the rotors of a gas turbine operated by gaseous combustion products and of an air blower which are coupled to each other, both of which are subjected to external shocks at irregular intervals, to minimize the injurious effects thereon of such shocks, comprising interrupting the flow of the combustion products normally driving the gas turbine rotor on the occurrence of a condition tending to give rise to an external shock, simultaneously applying a non-combustible gas under pressure to at least one of the intercoupled rotors in the direction of rotation thereof when the turbine rotor is normally driven by the combustion products, and maintaining the application of the non-combustible gas in such direction for the duration of the condition.

References Cited in the file of this patent

UNITED STATES PATENTS

| 1,247,930 | Campbell | Nov. 27, 1917 |
| 1,896,765 | Brock | Feb. 7, 1933 |
| 2,303,190 | Anderson | Nov. 24, 1942 |
| 2,591,540 | Grylls | Apr. 1, 1952 |